United States Patent

Takaishi et al.

[11] Patent Number: 5,941,089
[45] Date of Patent: Aug. 24, 1999

[54] ABSORPTION REFRIGERATING/HEATING APPARATUS

[75] Inventors: Toshimitsu Takaishi; Kazuma Ichikawa; Hidetaka Kayanuma, all of Saitama, Japan

[73] Assignee: Honda Giken Kogyo Kabushiki Kaisha, Tokyo, Japan

[21] Appl. No.: 09/000,780

[22] Filed: Dec. 30, 1997

[30] Foreign Application Priority Data

Jan. 10, 1997 [JP] Japan ..................... 9-013213

[51] Int. Cl.⁶ .................. F25B 15/00; G05D 23/00
[52] U.S. Cl. ......................... 62/324.2; 237/2 B
[58] Field of Search ...................... 62/324.2, 101, 62/476, 497, 103, 105, 483; 237/2 B

[56] References Cited

U.S. PATENT DOCUMENTS

| | | | |
|---|---|---|---|
| 4,312,476 | 1/1982 | Pohlmann | 237/2 B |
| 4,394,959 | 7/1983 | De Vries | 237/2 B |
| 4,526,009 | 7/1985 | Van Der Sluys et al. | 62/101 |

FOREIGN PATENT DOCUMENTS

| | | |
|---|---|---|
| 1-47714 | 10/1989 | Japan . |
| 6-2980 | 1/1994 | Japan . |
| 6-97127 | 11/1994 | Japan . |
| 7-96977 | 10/1995 | Japan . |
| 9-318183 | 12/1997 | Japan . |

*Primary Examiner*—William Doerrler
*Attorney, Agent, or Firm*—Armstrong, Westerman, Hattori, McLeland & Naughton

[57] ABSTRACT

An absorption refrigerating/heating apparatus which performs in any of three modes; refrigerating, thermodynamic heating, and direct flame heating and improves the thermal efficiency during the operation of a direct flame heating mode to decrease the running cost. In the direct flame heating mode, the refrigerant and/or the absorbent is passed to the regenerator to decrease the concentration of the absorbent in the solution in the regenerator. Consequently, the temperature of the solution required for maintaining the vapor pressure in the regenerator at a desired rate can be lowered thus saving the heat needed for heating the solution.

8 Claims, 2 Drawing Sheets

ABSORPTION REFRIGERATING/HEATING APPARATUS

BACKGROUND OF THE INVENTION

1. Field of the Invention

The present invention relates to an absorption refrigerating/heating apparatus or airconditioner and particularly, an absorption refrigerating/heating apparatus for heating at high efficiency with a heat pump in an ordinary heating mode and, when the outside air temperature is too low to pump up heat, shifting to a direct flame heating mode to maintain the heating capacity to a desired level, and improving an efficiency in the direct flame heating mode.

2. Description of the Related Art

Disclosed in Japanese Patent Publication Nos. Hei 1-47714 and Hei 7-96977 and Japanese Patent Laid-open Publication No. Hei 6-2980 are prior art absorption heat-pump apparatus and absorption refrigerating/heating water apparatus comprising, an evaporator for accommodating a refrigerant, an absorber for accommodating a solution which includes an absorbent for absorbing a refrigerant vapor generated in the evaporator, a regenerator for heating a portion of the solution to extract the refrigerant vapor for recovery of the concentration of the absorbent in the solution, a condenser for condensing the refrigerant vapor extracted and passing the refrigerant to the evaporator, which are commonly used for airconditioning. An absorption refrigerating/heating apparatus which performs in any of three modes; refrigerating, thermodynamic heating, and direct flame heating is depicted in Japanese Patent Publication No. Hei 6-97127.

The above mentioned conventional air-cooled type absorption refrigerating/heating apparatus will be low in the thermal efficiency when operated in a direct flame heating mode, thus increasing the running cost.

SUMMARY OF THE INVENTION

It is an object of the present invention to provide an absorption refrigerating/heating apparatus which eliminates the above disadvantage and improves the thermal efficiency during the operation of a direct flame heating, mode to decrease the running cost.

In an absorption refrigerating/heating apparatus according to the present invention comprising an evaporator for accommodating a refrigerant, an absorber for accommodating a solution which includes an absorbent for absorbing a refrigerant vapor generated in the evaporator and producing absorption heat, a regenerator for heating a portion of the solution to extract the refrigerant vapor for recovery of the concentration of the absorbent in the solution, a condenser for condensing the refrigerant vapor extracted and passing the refrigerant to the evaporator, and the apparatus according to the present invention can be selectively operative in any one of a cooling mode, a thermodynamic heating mode, and a direct flame heating mode, the improvement comprising: a return passage for directly circulating back the refrigerant from the condenser to the regenerator in the direct flame heating mode; and means for decreasing the concentration of the absorbent in the solution in the regenerator to a lower level in the direct flame heating mode than that in the thermodynamic heating mode.

In the direct flame heating mode, at least one of the refrigerant in the evaporator and the absorbent in the absorber is passed to the regenerator to decrease the concentration of the absorbent in the solution in the regenerator to a level which is lower than that in the thermodynamic heating mode. Consequently, the temperature of the solution required for maintaining the vapor pressure in the regenerator at a desired rate can be lowered thus decreasing the input of heat needed for heating the solution, improving the thermal efficiency of the apparatus and reducing the overall running cost in the direct flame heating mode.

DETAILED DESCRIPTION OF THE PREFERRED EMBODIMENT

Figure 1:
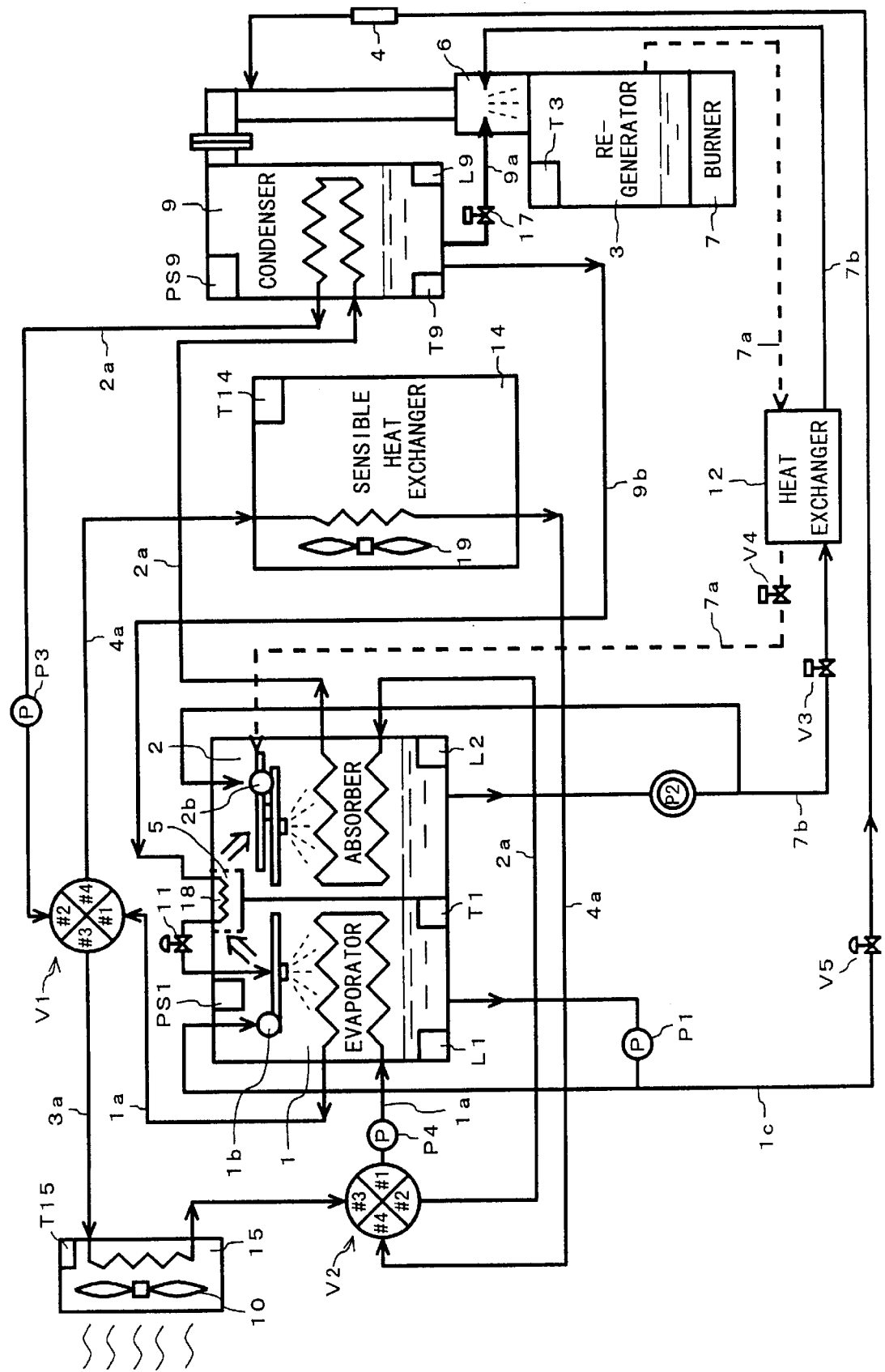
FIG. 1 is a diagram of a refrigerating/heating apparatus showing an embodiment of the present invention.

A preferred embodiment of the present invention will be described in more detail referring to the accompanying drawings. FIG. 1 is a block diagram showing a primary part of an absorption refrigerating/heating apparatus of the embodiment of the present invention. An evaporator 1 accommodates a refrigerant of fluoride alcohol, such as trifluoroethanol (TFE), while an absorber 2 accommodates a solution of DMI derivative, such as dimethyl-imidazolidinon, which contains an absorbent. The refrigerant is not limited to fluoride alcohol but may be an appropriate agent of which the nonfreezing range is wide. The solution is not limited either to the DMI derivative and it may be any other absorbent solution which is wide in the nonfreezing range, being higher than TFE in atmospheric temperature boiling point and having an enough power to absorb TFE. For example, a combination of water and lithium bromide is unfavorable as the solution in the present embodiment, since water as a coolant may be frozen by a temperature drop of the solution during the operation of the heating mode with the outside air temperature being about zero degree.

The evaporator 1 and the absorber 2 are fluidly communicated to each other by a (refrigerant) vapor passage 5. When the evaporator 1 is kept under a low pressure condition of e.g. 30 mmHg, the refrigerant is vaporized therein and moves via the vapor passage 5 into the absorber 2, as denoted by the double-line arrows. The refrigerant vapor is then absorbed by the absorbent in the absorber 2 thus causing an absorption freezing action. A cooler (or a heat exchanger) 18 is disposed in the vapor passage 5.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution will be described later in more detail. A tube 1a for passing a chilled water is mounted to run through the evaporator 1 by using a pump P4. The tube 1a is connected at one end (the exit side in the embodiment shown) to the No.1 opening of a first four-way valve V1 and at the other end (the entrance side in the embodiment) to the No.1 opening of a second four-way valve V2. The refrigerant is fed by the action of a pump P1 to a spraying means 1b mounted in the evaporator 1 for being sprayed over the tube 1a in which the chilled water runs. The refrigerant deprives the chilled water in the tube 1a of heat and turns to a vapor which passes via the vapor passage 5 into the absorber 2. Consequently, the temperature of the chilled water is more declined. The refrigerant in the evaporator 1 is supplied via a filter 4 to a rectifier 6, which will be explained later, as well as fed to the spraying means 1b by a pump P1. A flow valve V5 is mounted across a bleeding line or a passage 1c between the evaporator 1 and the filter 4. The chilled water running in the tube 1a may preferably be either an ethylene glycol or propylene glycol water solution.

As the refrigerant vapor is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No.2 opening of the first four-way valve V1 and at the other end (the entrance side) to the No.2 opening of the second four-way valve V2. Preferably, the cooling water running along the tube 2a is the same as the chilled water which runs across the tube 1a in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve V3 to the rectifier 6 and the regenerator 3 by the pump P2. The regenerator 3 is provided with the burner 7 for heating up the diluted solution. The burner 7 may be a gas burner or any other heating means. The solution is heated by the burner 7 and the concentration of the absorbent is increased as the refrigerant vapor is separated. The resultant (concentrated) solution is returned via a tube 7a and a control valve V4 to the absorber 2 where it is sprayed over the tube 2a by the spraying means 2b and pump P2.

The refrigerant vapor generated in the regenerator 3, when passing upward in the rectifier 6, comes in direct contact with the absorbent solution falling down therein and can thus release a remaining small amount of the absorbent solution before it passes to the condenser 9. The refrigerant vapor is cooled down and liquefied by the condenser 9. The refrigerant in a liquid form is then passed through a tube 9b, a cooler 18, and a reducing valve (flow valve) 11 and returned back to the evaporator 1 for spraying from the spraying means 1b. The cooler 18 is a type of heat exchanger which heats up a mist of the refrigerant in the vapor from the evaporator 1 with the higher temperature refrigerant from the condenser 9 for accelerating the evaporation of the refrigerant mist and, on the other hand, cooling down the relatively higher temperature refrigerant which is then fed back to the evaporator 1.

Although the purity of the refrigerant fed back from the condenser 9 is fairly high in the evaporator 1, it may or must gradually be declined because a very small amount of the absorbent in the circulated vapor is accumulated during a long period of the cycle operation. For recovering the purity of the refrigerant, a small portion of the refrigerant from the evaporator 1 is sent through the valve 5 and the filter 4 to the rectifier 6 where it is mixed with the refrigerant vapor from the regenerator 3. The filter 4 is used for preventing filler tubes of the rectifier 6 from being fouled with dirt and/or rust in the absorbent solution which may cause degradation of the functional operation.

A heat exchanger 12 is provided in the middle way of the tubes 7a and 7b which respectively connect the absorber 2 and the rectifier 6. The absorbent solution at high concentration and high temperature which runs along the tube 7a from the regenerator 3 is subjected to a heat exchanging action in the heat exchanger 12 with the diluted solution which runs along the tube 7b from the absorber 2, hence being cooled before it is fed to the absorber 2 where it is sprayed. In reverse, the diluted solution is preheated by the action of the heat exchanger 12 and passed to the rectifier 6. This will surely improve the thermal efficiency in the apparatus. In addition, another heat exchanger (not shown) may be provided for transferring heat from the concentrated solution to the cooling water which runs along the tube 2a from the absorber 2 or the condenser 9. Accordingly, the temperature of the concentrated solution returned to the absorber 2 will be reduced further while the temperature of the cooling water will be increased.

A sensible heat exchanger 14 is also provided with a tube 4a for heat exchange between the cooling water or the chilled water and the outside air and an indoor unit 15 is provided with a tube 3a. The tubes 3a and 4a are connected at one end (the entrance side in the embodiment shown) to the No.3 and No.4 openings of the first four-way valve V1, respectively, and at the other end (the exit side) to the No.3 and No.4 openings of the second four-way valve V2, respectively. The indoor unit 15 is located in a room to be cooled or heated and includes a fan 10 used in common for blowing out either cooling air and heating air from its blowing window (not shown). The sensible heat exchanger 14 is normally placed in the outdoor and includes a fan 19 for forcedly exchanging of heat with the outside air.

Figure 2:
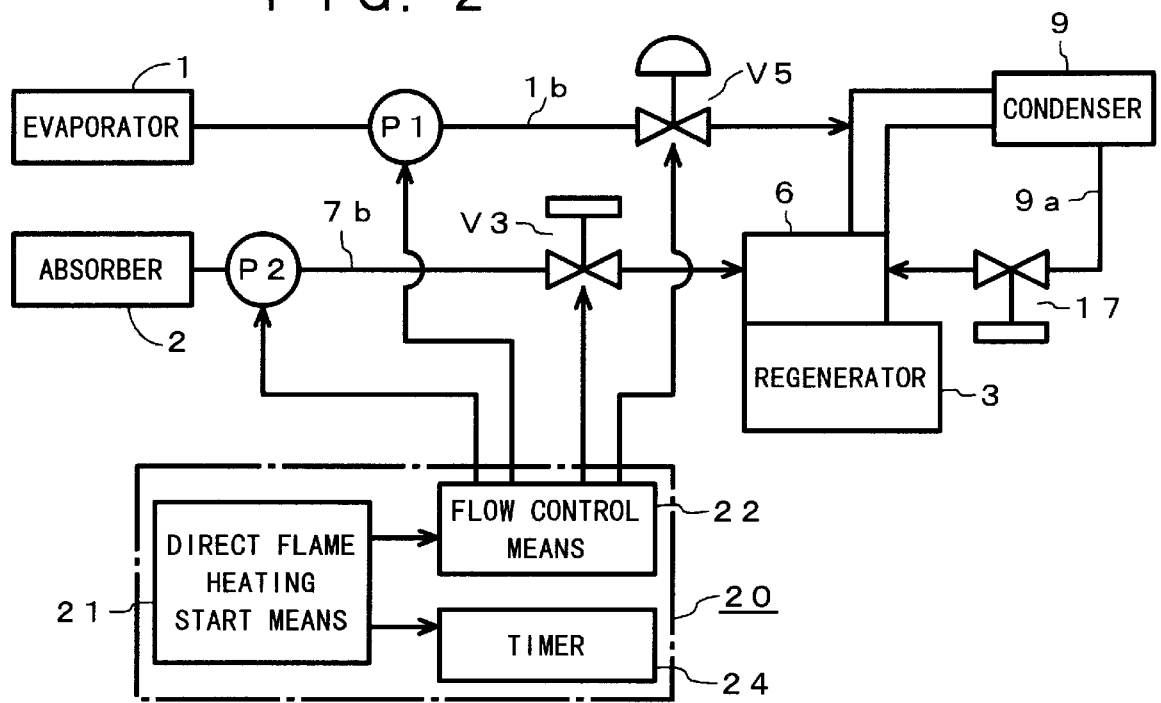
FIG. 2 is a schematic block diagram of a control device which includes pumps and valves for switching to the direct flame heating mode in the refrigerating/heating apparatus shown in FIG. 1.

The letters T, L, and PS with numeral subscripts, in FIGS. 1 and 2, represent a thermal sensor, a liquid level meter, and a pressure sensor, respectively. Opening/closing or flow valves are denoted by V with numeral subscripts.

In operation of the thermodynamic heating mode with the heat pump action, the first and second four-way valves V1 and V2 are actuated so that the No.1 and No.4 openings are communicated to each other and the No.2 and No.3 openings are communicated to each other. Accordingly, the cooling water heated by the absorber 2 and the condenser 9 is passed from the tube 2a to the tube 3a in the indoor unit 15 for heating up the room.

When the outside air temperature extremely drops in the thermodynamic heating mode with the heat pump action, the sensible heat exchanger 14 hardly pumps up heat from the outside air thus lowering the heating capability. With such a very low temperature at the outside, the thermodynamic heating is halted and the refrigerant vapor generated in the regenerator 3 is circulated back from the condenser 9 to the regenerator 3 to enable the direct flame heating mode in which heat produced by the burner 7 is transferred with high efficiency to the cooling water which runs through the tube 2a in the condenser 9, thus contributing to raising the temperature of the cooling water and the increase of the heating capability in the apparatus.

For that purpose, a bypass passage 9a with a switching valve 17 are provided between the condenser 9 and the rectifier 6 (or the regenerator 3) as shown in FIG. 1. When the outside air temperature drops affecting the heating capability, the tube 9b from the condenser 9 to the evaporator 1 and the tubes 7a and 7b for passing the diluted solution and the concentrated solution between the absorber 2 and the regenerator 3 all are closed to stop the thermodynamic heating action.

In the present embodiment, at least one of the refrigerant in the evaporator 1 and the absorbent solution in the absorber 2 is sent by the pumps P1 and P2 via the conduits 1c and 7b to the regenerator 3 where the concentration of the absorbent is decreased. Then, the switching valve 17 is opened to directly circulate the vapor from the regenerator 3 to the condenser 9. This minimizes the output heat of the burner 7 required for heating the cooling water in the conduit 2a to a target temperature as will be described later.

FIG. 2 is a block diagram showing the control device 20 for controlling the pumps and valves when the heating mode is shifted to the direct flame heating mode. Upon the direct flame heating mode being selected by a (refrigerating/heating) operation mode determining means, explained later, or a manual action, a direct flame heating starting means 21 starts up a flow controlling means 22. The flow controlling means 22 switches on at least one of the pumps P1 and P2 and fully opens the corresponding valve V5 and/or V3 to deliver the refrigerant and/or solution to the regenerator 3 within the shortest possible time. The time required for delivering the refrigerant and/or solution to the regenerator 3 or the operating time of the pump P1 or P2 is determined by a timer 24. As the timer 24 is set to a desired period, the flow of the refrigerant and/or solution is so adjusted that the liquid level in the regenerator 3 stays lower than the inlet of the refrigerant from the condenser 9 through the passage 9a to the regenerator 3 or the rectifier 6. The liquid level may be monitored with a level meter (not shown) mounted in the regenerator 3 or the rectifier 6.

Figure 3:
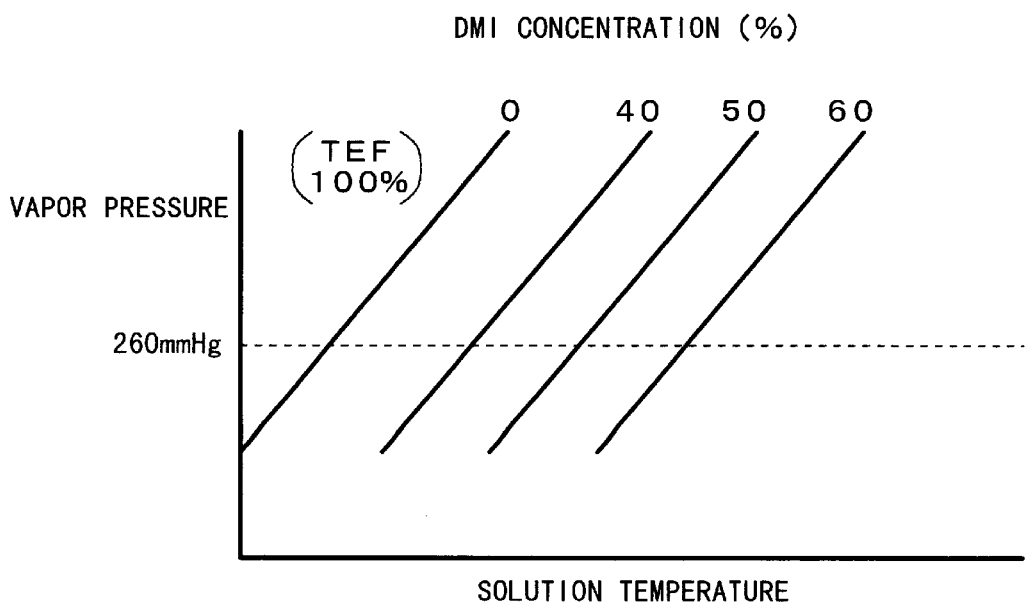
FIG. 3 is a characteristic graph showing the relation between the temperature of a solution and the pressure of a steam with the concentration of an absorbent in the solution being changed.

The improvement of the thermal efficiency in the direct flame heating mode by decreasing the concentration of the absorbent in the solution in the regenerator 3 is now explained. FIG. 3 is a Dühring chart showing the relation between the temperature and the concentration of the absorbent (DMI derivative) in the solution with the condensation pressure of (TFF) refrigerant vapor. As is apparent from the chart, the temperature of the solution can be kept lower to maintain the inside of the condenser 9 at a given pressure (for example, 260 mmHg) when the concentration of the absorbent is lower. The present invention uses such characteristics of the solution. When the concentration of the absorbent in the solution is kept as low as possible to decrease the temperature of the solution required for maintaining a volume of the refrigerant vapor generated in the regenerator 3, the thermal efficiency in the direct flame heating mode will be improved. As the temperature of the solution is kept low, the fuel used in the burner 7 is saved, the temperature of exhaust gas is lowered, and the radiant heat and the spontaneous radiation from the regenerator or the solution therein are minimized. Accordingly, the thermal efficiency in the direct flame heating mode will be improved as the whole.

The switching to the direct flame heating mode for increasing the capability of heating is automatically executed by starting the direct flame heating mode starting means 21 when the air temperature is detected having dropped to a particular degree with a thermal sensor T14 mounted at an appropriate location (for example, close to the sensible heat exchanger 14) in the inside or outside of the room. The drop of the outside air temperature to the particular degree can be measured by detecting the load for heating. The calculation of the heating load and the switching to the direct flame heating mode are disclosed in more detail in the Japanese Patent Applications No. Hei 8-94714, "Absorption refrigerating/heating apparatus" and No. Hei 8-333056, "Absorption refrigerating/heating apparatus", by the present applicant, which are cited for reference and incorporated in this specification.

From experiments conducted by the inventors of the present application, it was found that the solution temperature in the regenerator was decreased lower by conveying all of the refrigerant to the regenerator and, then supplementarily feeding the absorbent than vice versa. Although the refrigerant is directly fed back from the condenser to the regenerator for starting the direct flame heating mode after at least one of the refrigerant and the absorbent solution has been supplied to the regenerator in the above description, it is also possible to circulate back the refrigerant to the regenerator for starting the direct flame heating mode upon the regenerator being fed with at least one of the refrigerant and the absorbent solution. The condenser may be replaced by any other appropriate form of a partial condenser or dephlegmator.

In the refrigerating mode of the absorption refrigerating and heating apparatus of the present invention shown in FIG. 1, the first and second four-way valve VI and V2 are respectively actuated so that the No.1 and No.3 openings are communicated to each other and the No.2 and No.4 openings are communicated to each other. Accordingly, the chilled water in the tube 1a provided in the evaporator 1 is fed to the tube 3a in the indoor unit 15 for cooling the room. When the chilled water cooled by the refrigerant in the evaporator 1 is fed to the indoor unit 15, the cooling air is blown into the room by the blowing fan 10.

According to the present invention, the concentration of the absorbent in the solution in the regenerator is positively declined in the direct flame heating mode, thus allowing the solution temperature in the regenerator for generating the refrigerant vapor essential for maintaining the temperature of the cooling water flowing through the conduit 2a in the condenser to be lowered. This attenuates the input of heat (from the burner 7) to the regenerator and can thus improve the thermal efficiency and decrease the running cost.

Also, the lowering of the solution temperature in the regenerator during the direct flame heating mode minimizes the mixing of the refrigerant vapor with the absorbent, regardless of the direct feeding back of the refrigerant from the condenser to the regenerator, that is, the direct circulation of the refrigerant between the condenser and the regenerator. Accordingly, the shift to a normal operation would readily be conducted upon being switched to the thermodynamic heating mode. This is particularly advantageous in such a condition that a difference between, for example, the TFE refrigerant and the DMI derivative solution in the evaporating temperature is relatively small. More particularly, the low heating temperature in the regenerator decreases the mixing of the solution vapor with the refrigerant, while the high heating temperature accelerates that mixing.

What is claimed is:

1. An absorption refrigerating/heating apparatus comprising an evaporator for accommodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

a return passage for directly returning the refrigerant from the condenser to the regenerator in the direct flame heating mode; and lines connecting between said evaporator and said regenerator and between said absorber and said regenerator for supplementally feeding, in the direct flame heating mode, at least one of the refrigerant in the evaporator and the absorbent solution in the absorber to the regenerator to have the concentration of the absorbent in a mixed solution including the refrigerant and absorbent in the regenerator lower than that which exists in the regenerator in the thermodynamic heating mode.

2. An absorption refrigerating/heating apparatus comprising an evaporator for accommodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

a rectifier disposed between the regenerator and the condenser for separating the absorbent solution mixed in the refrigerant vapor produced in the regenerator; and a return passage for directly returning the refrigerant from the condenser to the regenerator in the direct flame heating mode; and lines connecting between said evaporator and said regenerator and between said absorber and said regenerator for supplementally feeding, in the direct flame heating mode, at least one of the refrigerant in the evaporator and the absorbent solution in the absorber to the regenerator to have the concentration of the absorbent in a mixed solution including the refrigerant and absorbent in the regenerator lower than that which exists in the regenerator in the thermodynamic heating mode.

3. An absorption refrigerating/heating apparatus comprising an evaporator for acconmmodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

a return passage for directly returning the refrigerant from the condenser to the regenerator in the direct flame heating mode; and means for feeding, in the direct flame heating mode, at least one of the refrigerant in the evaporator and the absorbent solution in the absorber to the regenerator to have the concentration of the absorbent in the solution in the regenerator lower than that which exists in the regenerator in the thermodynamic heating mode, wherein said at least one of the refrigerant and the absorbent solution is controlled in being fed into the regenerator so that the level of the absorbent solution in the regenerator stays not exceeding the level of a drain opening for releasing the refrigerant to the regenerator from the condenser.

4. An absorption refrigerating/heating apparatus according to claim 1, wherein said at least one of the refrigerant and the absorbent solution is fed to the regenerator before the refrigerant begins to be directly circulated back from the condenser to the regenerator in the direct flame heating mode.

5. An absorption refrigerating/heating apparatus comprising an evaporator for accommodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

a return passage for directly returning the refrigerant from the condenser to the regenerator in the direct flame heating mode; and means for feeding, in the direct flame heating mode, at least one of the refrigerant in the evaporator and the absorbent solution in the absorber to the regenerator to have the concentration of the absorbent in the solution in the regenerator lower than that which exists in the regenerator in the thermodynamic heating mode, wherein the refrigerant in the evaporator is fed to the regenerator at higher priority than the absorbent solution in the absorber.

6. An absorption refrigerating/heating apparatus comprising an evaporator for accommodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

means disposed between the regenerator and the condenser for separating the absorbent solution mixed in the refrigerant vapor produced in the regenerator; and a return passage for directly returning the refrigerant from the condenser to the regenerator in the direct flame heating mode; and means for feeding, in the direct flame heating mode, at least one of the refrigerant in the evaporator and the absorbent solution in the absorber to the regenerator to have the concentration of the absorbent in the solution in the regenerator lower than that which exists in the regenerator in the thermodynamic heating mode, wherein said at least one of the refrigerant and the absorbent solution is controlled in being fed into the regenerator so that the level of the absorbent solution in the regenerator stays not exceeding the level of a drain opening for releasing the refrigerant to the regenerator from the condenser.

7. An absorption refrigerating/heating apparatus according to claim 2, wherein said at least one of the refrigerant and the absorbent solution is fed to the regenerator before the refrigerant begins to be directly circulated back from the condenser to the regenerator in the direct flame heating mode.

8. An absorption refrigerating/heating apparatus comprising an evaporator for accommodating a refrigerant, an absorber for accommodating a solution which includes an absorbent for absorbing a vapor of the refrigerant produced in the evaporator, a regenerator for extracting the refrigerant vapor by heating a portion of the solution to recover the concentration of the absorbent in the solution, and a condenser for condensing the refrigerant vapor extracted and for feeding the refrigerant thus condensed to the evaporator, in which apparatus the operation can be selected from a cooling mode, a thermodynamic heating mode, and a direct flame heating mode, said apparatus further comprising:

means disposed between the regenerator and the condenser for separating the absorbent solution mixed in the refrigerant vapor produced in the regenerator; and a return passage for directly returning the refrigerant from the condenser to the regenerator in the direct flame heating mode; and means for feeding, in the direct flame heating mode, at least one of the refrigerant in the evaporator and the absorbent solution in the absorber to the regenerator to have the concentration of the absorbent in the solution in the regenerator lower than that which exists in the regenerator in the thermodynamic heating mode, wherein the refrigerant in the evaporator is fed to the regenerator at higher priority than the absorbent solution in the absorber.

* * * * *